United States Patent
Lo et al.

(10) Patent No.: US 7,155,978 B2
(45) Date of Patent: Jan. 2, 2007

(54) MICRO ANGULAR RATE SENSOR

(75) Inventors: Yuan Lo, Longtan Township, Taoyuan County (TW); Kye-Chyn Ho, Longtan Township, Taoyuan County (TW); Lung-Yung Lin, Hsinchu (TW); Chih-Wei Tseng, Banciao (TW); Schiu Sche, Hsinchu (TW)

(73) Assignees: Chung Shan Institute of Science and Technology, Taoyuan County (TW); Neostones Micro Fabrication Corporation, Hsinchu (TW)

( * ) Notice: Subject to any disclaimer, the term of this patent is extended or adjusted under 35 U.S.C. 154(b) by 131 days.

(21) Appl. No.: 10/974,760

(22) Filed: Oct. 28, 2004

(65) Prior Publication Data

US 2005/0252292 A1  Nov. 17, 2005

(30) Foreign Application Priority Data

May 14, 2004  (TW) .............................. 93113693 A

(51) Int. Cl.
*G01P 9/04* (2006.01)
(52) U.S. Cl. .................................. 73/504.13
(58) Field of Classification Search ............ 73/504.13, 73/514.12, 504.14, 504.16
See application file for complete search history.

(56) References Cited

U.S. PATENT DOCUMENTS

| 5,450,751 A | 9/1995 | Putty et al. |
| 5,872,313 A | 2/1999 | Zarabadi et al. |
| 5,889,207 A | 3/1999 | Lutz |
| 6,089,090 A * | 7/2000 | Namerikawa et al. ... 73/504.13 |
| 6,276,205 B1 * | 8/2001 | McNie et al. ............ 73/504.13 |
| 6,282,958 B1 | 9/2001 | Fell et al. |
| 6,305,222 B1 | 10/2001 | Johnson et al. |
| 6,481,285 B1 | 11/2002 | Shkel et al. |
| 6,536,282 B1 * | 3/2003 | Kipp et al. ............... 73/504.14 |
| 6,539,804 B1 * | 4/2003 | Iwata ...................... 73/504.13 |
| 6,928,873 B1 * | 8/2005 | Chen et al. .............. 73/504.04 |

* cited by examiner

*Primary Examiner*—John E. Chapman
(74) *Attorney, Agent, or Firm*—Rabin & Berdo, P.C.

(57) ABSTRACT

A micro angular rate-sensing device is provided. A vibrator, having a plurality of proof masses connected to a ring, is arranged in a first base. Flexible supporting members connect to the vibrator to suspend the vibrator in the first base. Electrodes drive the vibrator to oscillate and control the oscillation mode of the vibrator in driving mode. Planar electrodes are arranged relative to the proof masses on a second base. The motion of the proof masses relative to the planar electrodes is sensed through the capacitance between the proof masses and the planar electrodes. The resonant structure with greater mass of the device generates greater Coriolis force and increases the sensing area. Thus, the intensity of sensed signals and noise-signal ratio are greatly increased. Furthermore, the device does not rely much on high aspect ratio manufacturing technology. Thus the manufacturing cost is reduced and the yield rate is increased.

50 Claims, 4 Drawing Sheets

MICRO ANGULAR RATE SENSOR

This Non-provisional application claims priority under 35 U.S.C. § 119(a) on Patent Application No(s). 093113693 filed in Taiwan, R.O.C on May 14, 2004, the entire contents of which are hereby incorporated by reference.

BACKGROUND OF THE INVENTION

1. Field of Invention

The invention relates an angular rate sensing device for an angular rate sensor or a micro gyroscope and, in particular, to an angular rate sensing device having a plurality of proof masses employed as a resonant structure for increasing the signal-sensing areas, such that greater Coriolis force is generated and Coriolis force intensity increases. Furthermore, the sensing areas and the intensity of the sensing signals are increased.

2. Related Art

The gyroscope is a device that measures rotating angles or angular rates by using the inertia principle. One of these is a micro gyroscope manufactured by micro technology. It has been used widely in many fields, such as anti-overturning systems for cars, airbag systems, industrial robots, 3D mice, and Global Positioning Systems. The characteristics of small volume, light weight, and low cost have made micro gyroscopes, which are becoming potentially commercial sensors, penetrate the market of traditional gyroscopes Due to the constraints of Microelectromechanical manufacturing technology and the consideration of endurance, most gyroscopes are vibratory. Besides the noise signal ratio of the signal sensing circuits, the structure is another element that affects the sensitivity and the performance. In the related art, the most important element, which also affects the performance of the micro gyroscope, is the ring-like vibrator. Patents relating to these technology fields are U.S. Pat. Nos. 5,450,751, 5,872,313, 5,889,207, 6,282,958, 6,305,222, and 6,481,285.

Patent '751 discloses a microstructure for a vibratory gyroscope. The microstructure has a ring portion supported in such a fashion as to allow substantially undamped, high-Q radial vibration. The ring portion is electrically conductive and comprises a charge plate for a plurality of radially disposed charge conductive sites around its perimeter for sensing radial displacements thereof. The ring, its support and charge conductive sites are formed within sacrificial molds on one surface of a conventional silicon substrate, which may comprise a monolithic integrated circuit.

Patent '313 discloses a motion sensor having a micromachine sensing element and electrodes formed on a silicon chip. The sensing element includes a ring supported above a substrate so as to have an axis of rotation normal to the substrate. Surrounding the ring is at least one pair of diametrically-opposed electrode structures. The sensing ring and electrode structures are configured to include interdigitized members whose placement relative to one another enables at least partial cancellation of the differential thermal expansion effect of the ring and electrodes.

Patent '207 discloses a rate of rotation sensor structured as a micromechanical component on the surface of a substrate. The rate of rotation sensor has a ring with drive elements and detection elements. The ring is made to oscillate by means of the drive elements, and the deformation of the ring that results from Coriolis forces is detected by the detection elements.

Patent '958 discloses an angular rate sensor including a ring-like resonator mounted by support beams extending from the inner periphery of the ring to a boss on a base. The support beams are flexible and allow the resonator to vibrate in response to an electrostatic drive in a substantially undamped oscillation mode to permit the resonator to move relative to the support in response to turning rate. Electrostatic sensors are provided for sensing movement of the resonator.

Patent '222 discloses a motion sensor including a micromachined sensing structure and a number of capacitive electrodes disposed about the periphery thereof. The sensing structure includes a ring supported above a substrate, and a number of springs attached to a post positioned at the center of the ring. Certain diametrically opposed capacitive electrodes are configured as drive electrodes, and other diametrically opposed capacitive electrodes, positioned 90 degrees relative to the corresponding drive electrodes, are configured as sense electrodes.

Patent '285 discloses a micro-machined angle measurement gyroscope including a substrate; a proof mass coupled to the substrate by an isotropic suspension; a plurality of drive electrodes configured to cause the proof mass to oscillate; and a plurality of sense electrodes configured to sense the motion of the proof mass in the plane of the substrate.

However, the aforementioned related art has some technical problems that need to be solved. For example, the mass of the resonant structure is so small that the intensity of Coriolis force is not significant. The supporting structure is not symmetrical so that the resultant Coriolis force does not indicate the original node, which may cause measurement error. Also, the signal-sensing area is not large enough so that the intensity of the signals is small, and therefore the difficulty of measurement increases. Although the high aspect ratio manufacture technology may reform these problems, the expense and machine investment may be prohibitive. Therefore, there is an urgent need for developing a new micro angular rate-sensing device.

SUMMARY OF THE INVENTION

In view of the foregoing problems, the object of the invention is to provide a micro angular rate-sensing device to substantially solve the problems and drawbacks of the related art.

In accordance with the principle of the invention, a resonant structure having greater mass is provided in the sensing device to increase the signal-sensing area. Meanwhile, the sensing structure does not need a high aspect ratio manufacturing process.

In order to achieve the object of the invention, the micro angular rate sensing device of the invention includes a first base, a second base, a vibrator having multiple proof masses arranged in the first base, a plurality of flexible supporting members, a plurality of electrodes and a plurality of planar electrodes arranged on the second base. The vibrator has a ring and a plurality of proof masses, which is connected to the vibrator. The flexible supporting member connects to the vibrator and supports the vibrator to be suspended in the first base. The electrodes controls and drives the flexible supporting members to oscillate. The planar electrodes are arranged relative to the proof masses for sensing motion of the proof masses relative to the planar electrodes through the capacitance variation between the planar electrodes and the proof masses.

According to the aspect of the invention, the proof mass is a floating parallel electrode, which forms a pair of sensing electrodes together with the planar electrodes on the second base. The electrodes are configured in differential circuits. The floating parallel electrodes and planar electrodes are slot type electrodes.

According to the aspect of the invention, the plurality of flexible supporting members comprises elements symmetrical to the driving axis or sensing axis of the vibrator, and equally arranged at the periphery of the vibrator. The flexible supporting member comprises a flexible supporter set having a pair of first supporters and a second supporter connected to the pair of the first supporters.

According to the aspect of the invention, each of the electrodes comprise a plurality of driving electrodes arranged at the positions of 0° and 180° of the vibrator; a plurality of close loop control electrodes arranged at the positions of 45° and 225° of the vibrator; and a plurality of compensating and control electrodes at the positions of 90°, 135°, 270° and 315° of the vibrator in order to compensate for error caused by non-uniformity or defects of the vibrator.

According to the aspect of the invention, the proof masses are employed as sensing electrodes, and comprise a plurality of first sensing electrodes arranged at the positions of 0°, 90°, 180° and 270° of the vibrator; and a plurality of second sensing electrodes arranged at the positions of 45°, 135°, 225° and 315° of the vibrator.

According to the aspect and principle of the invention, the micro angular rate-sensing device has a resonant structure with greater mass to generate greater Coriolis force. Therefore, the device has the advantage of Coriolis force with greater intensity.

According to the aspect and principle of the invention, the micro angular rate-sensing device has another advantage of increasing sensing areas and the sensing intensity of signals.

According to the aspect and principle of the invention, the micro angular rate-sensing device has another advantage of a lower requirement for the high aspect ratio manufacturing process. Therefore, the manufacture cost may be reduced and the yield rate increased.

According to the aspect and principle of the invention, the micro angular rate-sensing device has symmetrical flexible supporting members such that the resonant frequency of the sensing mode and driving mode in all directions become substantially the same for greater frequency match. Therefore, better amplification of amplitude sensitivity may be obtained. Furthermore, the resultant Coriolis force may be directed to the node of the driving mode. The error of the zero rate output (ZRO) and the cross-axis sensitivity may also be reduced effectively.

According to the aspect and principle of the invention, the micro angular rate-sensing device has another advantage of high precision and low cost.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the invention, examples of which are illustrated in the accompanying drawings. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
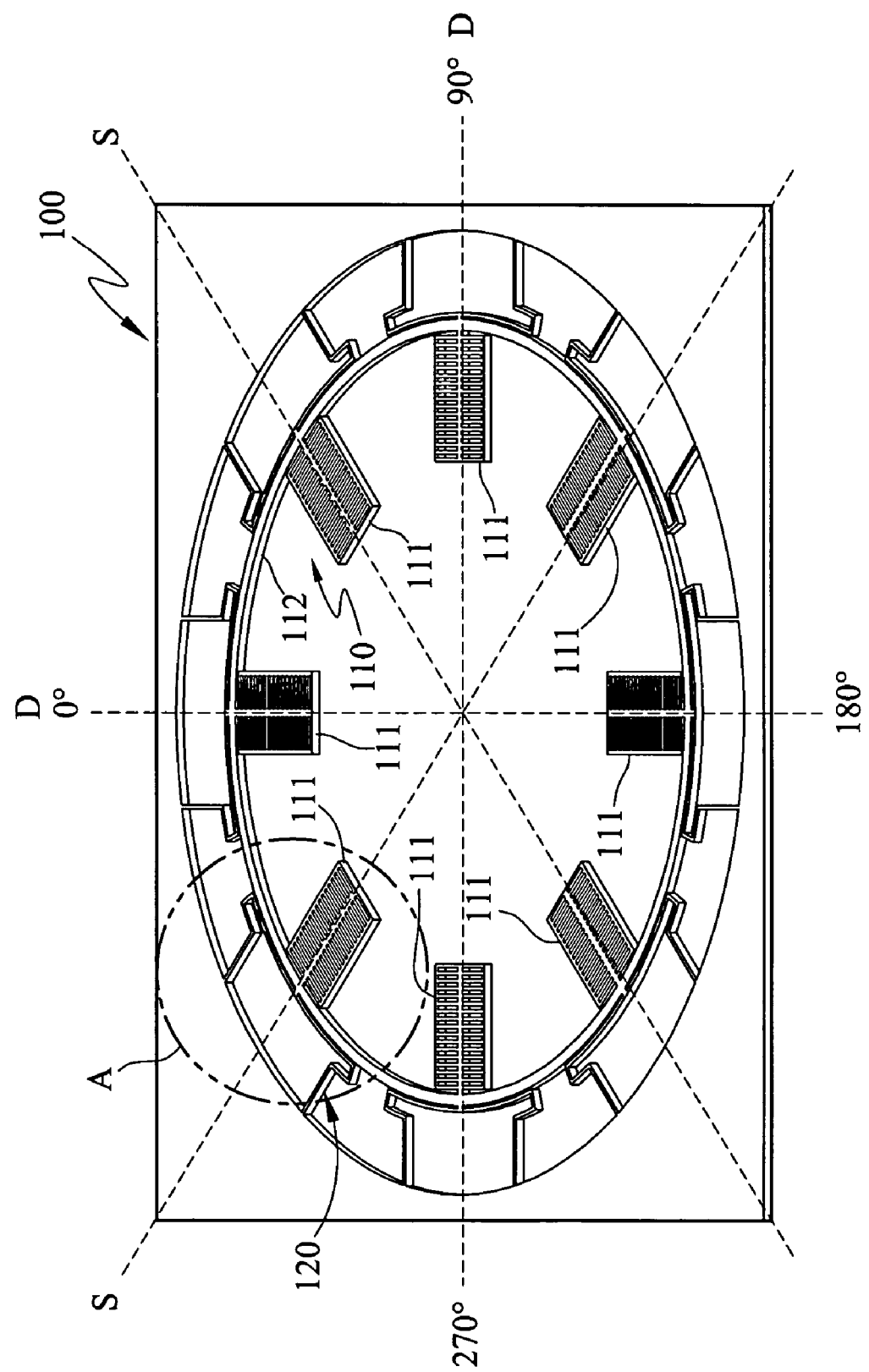
FIG. 1 is the schematic structure of the angular rate-sensing device in accordance with the invention.
Figure 2:
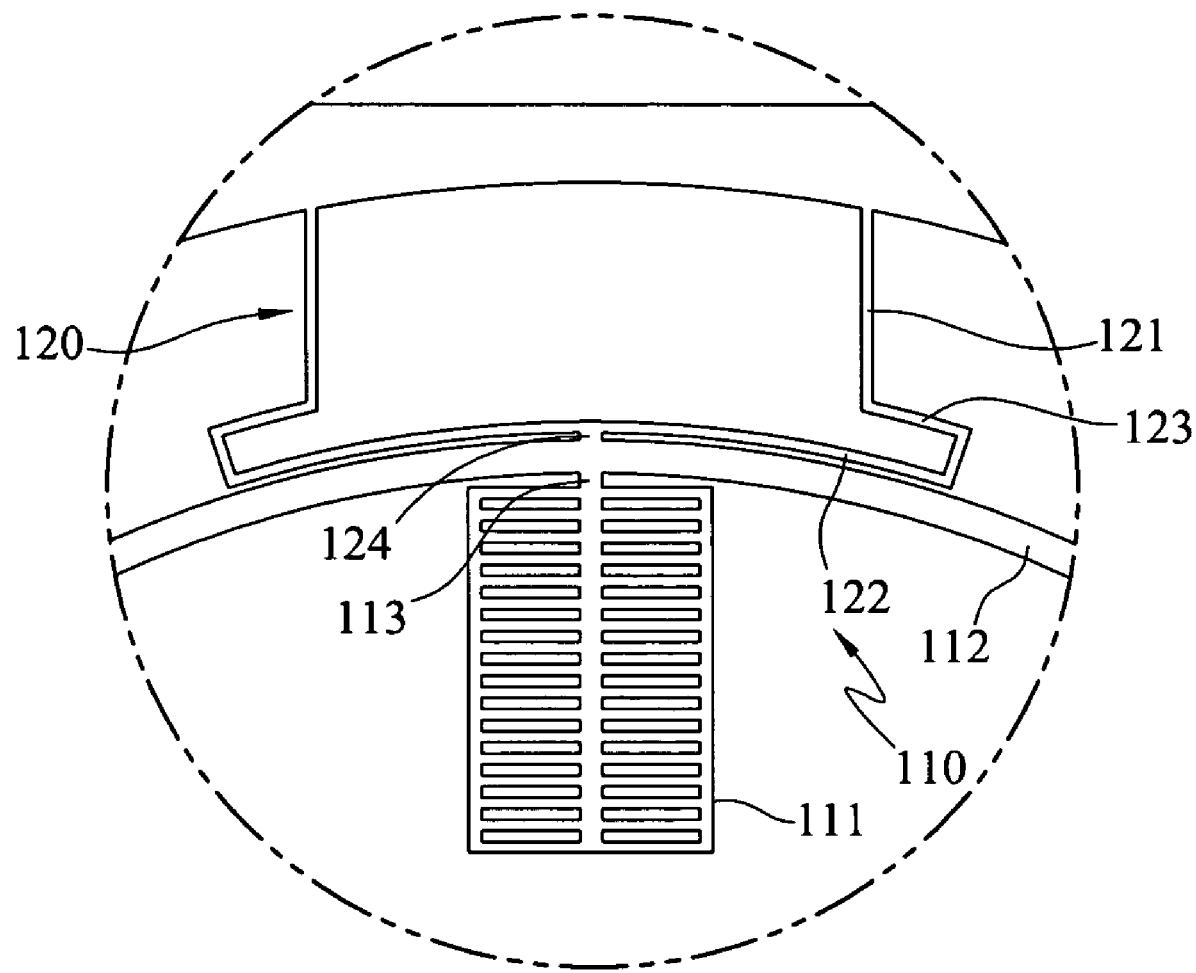
FIG. 2 is the enlarged diagram of the A portion of the angular rate-sensing device in accordance with the invention in FIG. 1.

Refer FIG. 1 and FIG. 2. FIG. 1 the schematic structure of the angular rate-sensing device in accordance with the invention, while FIG. 2 is the enlarged diagram of the A portion in FIG. 1. According to the principle of the invention, the micro angular rate-sensing device includes a first base 100, a vibrator 110 having multiple proof masses and a plurality of flexible supporting members 120. The vibrator 110 arranged on the first base 100 has a plurality of proof masses 111 and a ring 112. Each of the proof masses 111 is connected to the ring 112 of the vibrator 110 via a first connecting member 113. The flexible supporting member 120 is connected to the vibrator 110 to support the vibrator 110 in the first base 100 such that the vibrator 110 is suspended in the first base 100. The material of the first base 100 may be silicon-based material or glass, for example, while the material of the vibrator 110 may be silicon-based material or metal.

Each of the proof masses 111 may be, for example, parallel electrodes. In another embodiment, the proof masses 111 may be parallel slot type electrodes, which are connected to a differential circuit. Therefore, a double signal variation may be obtained through the differential circuit.

Each of the flexible supporting members 120 is composed of a flexible supporter set symmetrical to the driving axis D or sensing axis S of the vibrator 110 with multiple proof masses. Each flexible supporting member 120 is equally arranged at the periphery of the ring 112 of the vibrator 110 with multiple proof masses. In one embodiment, there are eight flexible supporting members. The flexible supporter set has a pair of first supporters 121 and a second supporter 122. The first supporters 121 have a bending portion 123 for connecting the first supporters 121 and the second supporter 122. The second supporter 122 is connected to the vibrator 110 via a second connecting member 124 to keep a predetermined distance between the second supporter 122 and the vibrator 110 with multiple proof masses.

As illustrated in FIG. 1, the proof masses 111 are arranged at the interior periphery of the ring 112 of the vibrator 110, while the flexible supporting members 120 are arranged at the exterior periphery of the ring 112 of the vibrator 110.

Figure 3A:
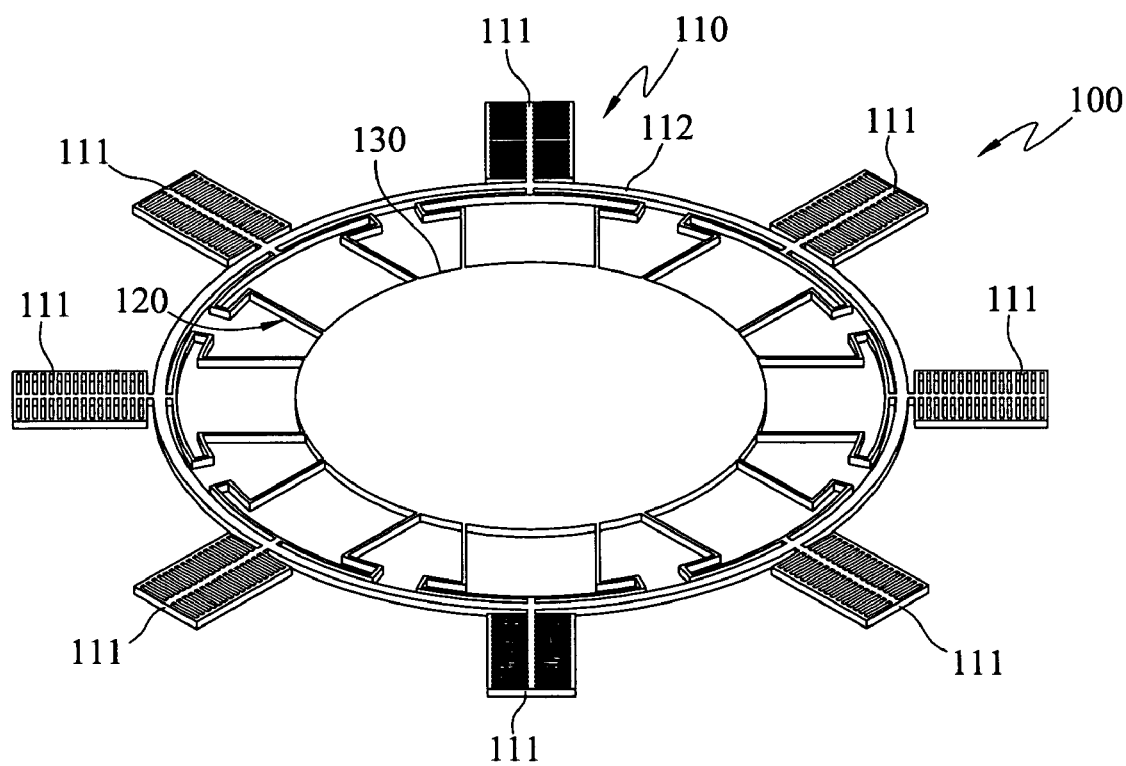
FIG. 3A is the schematic structure of another embodiment of the angular rate-sensing device in accordance with the invention.
Figure 3B:
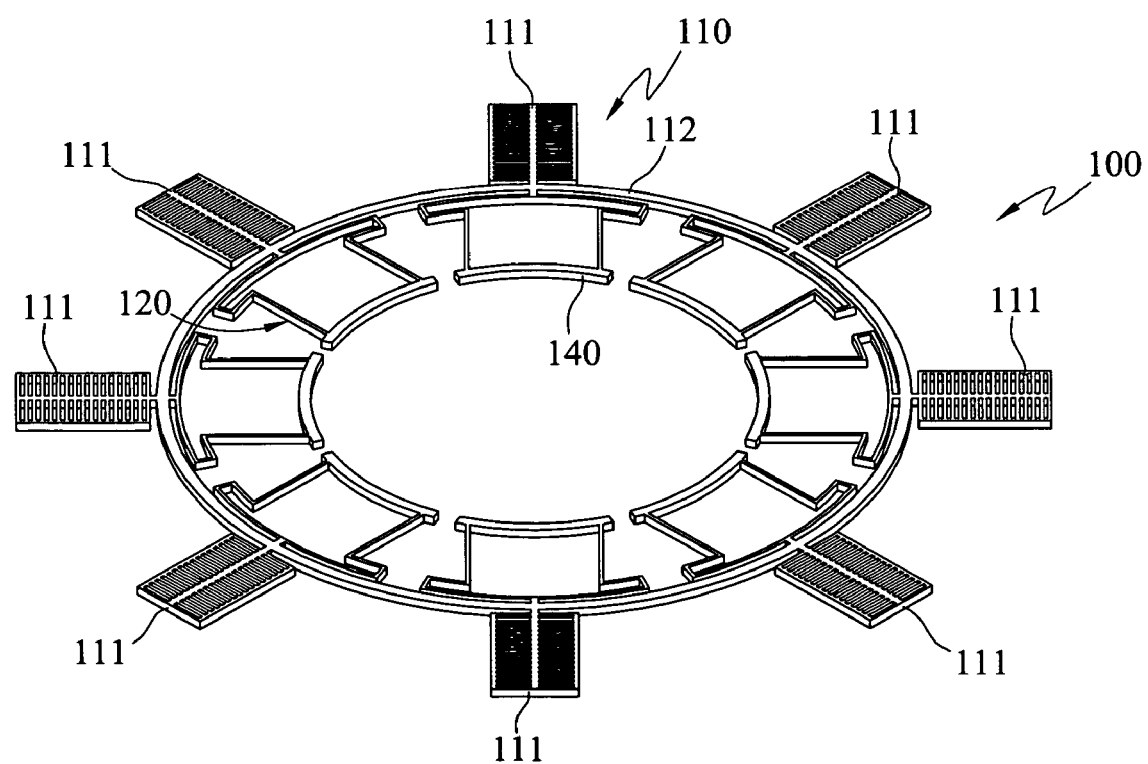
FIG. 3B is the schematic structure of another embodiment of the angular rate-sensing device in accordance with the invention.

FIGS. 3A and 3B illustrate the schematic structure of another embodiment of the angular rate-sensing device in accordance with the invention. In this embodiment, the vibrator 110 is arranged at the exterior periphery of the ring 112 of the vibrator 110, while the flexible supporting members 120 are arranged at the interior periphery of the ring 112 of the vibrator 110. Also, a supporting anchor 130 (as shown in FIG. 3A) or a concentric ring base 140 is arranged in the central portion of the vibrator 110 to connect the flexible supporting members 120.

Figure 4:
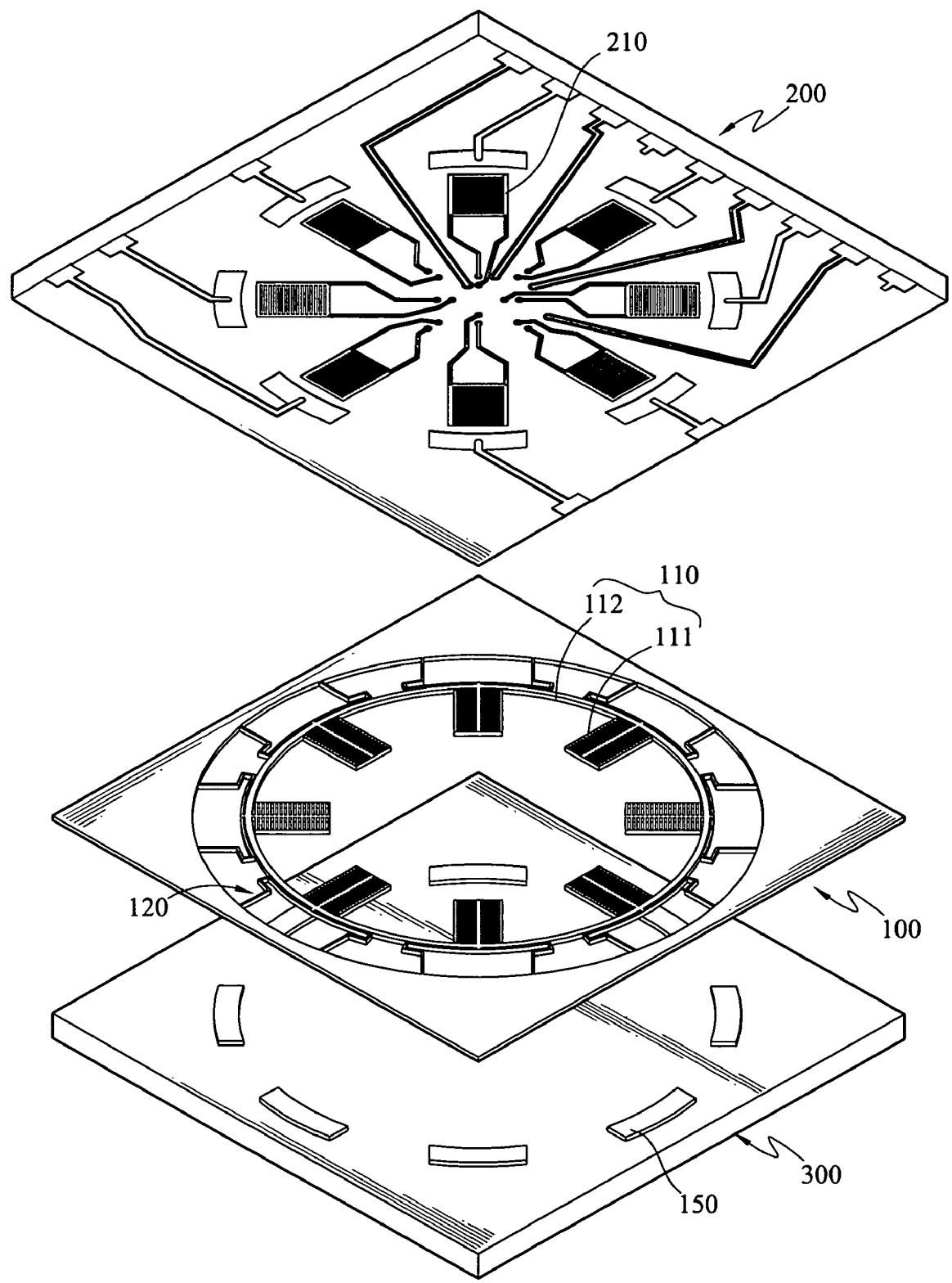
FIG. 4 is the schematic structure of another embodiment of the angular rate-sensing device having a first base, a second base and a third base in accordance with the invention.

According to the principle of the invention, in one embodiment, electrodes and sensing electrodes are also provided in the first base 100 and the second base 200 respectively, as illustrated in FIG. 4.

According to the principle of the invention, in one embodiment, the angular rate-sensing device in FIG. 4 includes a first base 100, a second base 200, a vibrator with multiple proof masses 110, a plurality of flexible supporting members 120, a plurality of electrodes 150 and a plurality of planar electrodes 210. The electrodes 150 control the driving mode of the vibrator through driving and controlling the flexible supporting members. The plurality of electrodes 150 drive and control the flexible supporting members 120 to oscillate such that the oscillation mode of the vibrator in driving mode may be controlled. The planar electrodes 210 may be planar slot type electrodes, for example, which are arranged relative to the proof masses 111 on the second base 200. Thus, the motion of the proof mass 111 relative to the electrode 210 may be sensed through the capacitance variation between the planar electrodes 210 and the proof masses 111.

Each of the plurality of electrodes 150 is equally arranged on another base (for example, as the third base 300 illustrated in FIG. 4). Each of the electrodes 150 lies inside each of the flexible supporting members 120 after assembly. Each electrode 150, proof mass 111, and flexible supporting member 120 are arranged relatively, and equally arranged at the vibrator 110. The electrodes 150 have two driving electrodes, two close loop control electrodes, and four compensating and control electrodes. The two driving electrodes are arranged at the positions of 0° and 180° respectively. The close loop control electrodes are arranged at the positions of 45° and 225° respectively. The compensating and control electrodes are arranged at the positions of 90°, 135°, 270°, and 315° respectively. The close loop control electrodes are employed to sense the output voltage obtained by the electrodes circuits. Through a compulsive balance circuit, the output voltage is fed back to the close loop control electrodes to generate electrostatic force. The compensating and control electrodes may compensate for error caused by nonuniformity or defects of the vibrator.

The proof masses 111 are employed not only to increase the inertia mass of the ring 112 when oscillating, but also as sensing electrodes together with the planar electrodes 210 formed on the second base 200 to sense the motion of the driving mode and sensing mode of the vibrator 110. Four first sensing electrodes and four second sensing electrodes are included. The first sensing electrodes are arranged at the positions of 0°, 90°, 180°, and 270°, while the second sensing electrodes are arranged at the positions of 45°, 135°, 225°, and 315°.

The planar electrodes may be planar slot type electrodes, which are arranged relative to the proof masses 111 on the second base 200. Thus, the motion of the proof mass 111 relative to the electrode 210 may be sensed through the capacitance variation between the planar electrodes 210 and the proof masses 111.

Also refer to FIG. 4. According to the principle of the invention, in one embodiment, the sensing device includes a first base 100, a second base 200 and a third base 300. For example, the third base 300 is bonded together with the first base 100 and the second base 200. In one embodiment, necessary control circuits for the sensing electrodes relative to the parallel electrodes may be arranged on the second base 200. In another embodiment, necessary control circuits for the electrodes 150 and the sensing electrodes may also be arranged on the third base 300. The third base 300 may be silicon-based material or glass.

According to the principle of the invention, the vibrator 110 is composed of proof masses 111 and a ring 112. Thus, the whole mass of the resonant structure is greater than that of prior art. The planar electrodes 210 and the proof masses 111 are arranged together to form pairs of sensing electrodes for sensing the area variation of the top and bottom electrode. In one embodiment, the proof masses 111 are floating parallel slot type electrodes, while the planar electrodes 210 are slot type electrodes, which are connected to a differential circuit to increase the sensing area variation effectively.

According to the principle of the invention, the operation of the micro angular rate-sensing device is illustrated in detail as follows.

Two electrodes 150 at the positions of 0° and 180° of the vibrator 110 drive the vibrator 110 with multiple proof masses to generate in-plane driving mode oscillation. The planar electrodes at the positions of 45°, 135°, 225°, and 315° detect the amplitude variation of the sensing mode caused by Coriolis force when oscillating. The displacement variation may be detected through the first sensing electrodes arranged at the positions of 0°, 90°, 180°, and 270° of the vibrator and the second sensing electrodes arranged at the positions of 45°, 135°, 225°, and 315° of the vibrator when the vibrator 110 oscillates at the driving mode and the sensing mode. Through the capacitance effect between the proof masses 111 and the planar electrodes 210, when displacement occurs due to oscillation of the vibrator 110, the proof masses 111 generate corresponding displacement. The inducted capacitance between the proof masses 111 and the planar electrodes 210 changes accordingly. Supposing the width of a slot on the proof masses 111 is X, the distance of a top and a bottom electrode is $d_a$, and the displacement of an electrode is $\Delta L$, the permittivity in free space is $\epsilon_0$, then the capacitance variation of a set of sensing units is $\Delta C = \epsilon_0 \times (X/d_a) \times \Delta L$. If slot type electrodes are employed, then N sets of sensing units are provided. Thus the whole capacitance variation is $\Delta C = N \times \epsilon_0 \times (X/d_a) \times \Delta L$. Therefore, the capacitance variation may be obtained through the area variations between the proof masses 111 and the planar electrodes 210 such that the capacitance variation increases.

According to the objective and principle of the invention, the disclosed micro angular rate-sensing device has a resonant structure with greater mass, which may generate greater Coriolis force and increase Coriolis force intensity. Furthermore, the sensing areas and the intensity of the sensing signals are increased. Besides, the disclosed device does not rely much on the high aspect ratio manufacturing technology. Thus, the manufacturing cost is reduced and the yield rate is increased.

Although the invention has been explained by the embodiments shown in the drawings described above, it should be understood by the person ordinary skilled in the art that the invention is not limited to these embodiments, but rather that various changes or modifications thereof are possible without departing from the spirit and scope of the invention. Accordingly, the scope of the invention shall be determined only by the appended claims and their equivalents.

What is claimed is:

1. An angular rate sensing device comprising:
   a base;
   a vibrator having a ring and a plurality of proof masses, arranged in the base, wherein the plurality of proof masses are parallel electrodes; and
   a plurality of flexible supporting members connected to the vibrator and supporting the vibrator to be suspended in the base.

2. The angular rate sensing device of claim 1, further comprises a first connecting member that connects each of the proof masses to the ring.

3. The angular rate sensing device of claim 1, wherein the electrodes are slot type parallel electrodes, which are configured in differential circuits.

4. The angular rate sensing device of claim 1, wherein the plurality of flexible supporting members comprises elements symmetrical to the driving axis or sensing axis of the vibrator, and are equally arranged at the periphery of the vibrator.

5. The angular rate sensing device of claim 4, wherein the flexible supporting member comprises a flexible supporter set comprising:
   a pair of first supporters; and
   a second supporter connected to the pair of the first supporters.

6. The angular rate sensing device of claim 5, wherein each of the pair of the first supporters further comprises a bending portion connecting the pair of the first supporters and the second supporter.

7. The angular rate sensing device of claim 5, wherein the flexible supporting member further comprises a second connecting member connecting the second supporter and the vibrator to keep a predetermined distance between the second supporter and the vibrator.

8. The angular rate sensing device of claim 1, wherein the flexible supporting members are arranged at the interior periphery of the vibrator, and the proof mass is arranged at the exterior periphery of the vibrator.

9. The angular rate sensing device of claim 1, wherein the flexible supporting members are arranged at the exterior periphery of the vibrator, and the proof mass is arranged at the interior periphery of the vibrator.

10. The angular rate sensing device of claim 8, further comprises an anchor or a concentric ring base arranged in the central portion of the vibrator to connect the flexible supporting members.

11. The angular rate sensing device of claim 1, wherein the material of the base is silicon-based material or glass, and that of the vibrator is silicon-based material or metal.

12. An angular rate sensing device comprising:
    a base;
    a vibrator having a ring and a plurality of proof masses, arranged in the base, wherein the plurality of proof masses are parallel electrodes; and
    a plurality of flexible supporting members connected to the vibrator and supporting the vibrator to be suspended in the base; and
    a plurality of electrodes for driving and controlling the vibrator to oscillate such that the oscillation mode of the vibrator in driving mode may be controlled.

13. The angular rate sensing device of claim 12, further comprises a first connecting member that connects each of the proof masses to the ring.

14. The angular rate sensing device of claim 12, wherein the electrodes are slot type parallel electrodes, which are configured in differential circuits.

15. The angular rate sensing device of claim 12, wherein the plurality of flexible supporting members comprises elements symmetrical to the driving axis or sensing axis of the vibrator, and are equally arranged at the periphery of the vibrator.

16. The angular rate sensing device of claim 15, wherein the flexible supporting member comprises a flexible supporter set comprising:
    a pair of first supporters; and
    a second supporter connected to the pair of the first supporters.

17. The angular rate sensing device of claim 16, wherein each of the pair of the first supporters further comprises a bending portion connecting the pair of the first supporters and the second supporter.

18. The angular rate sensing device of claim 16, wherein the flexible supporting member further comprises a second connecting member connecting the second supporter and the vibrator to keep a predetermined distance between the second supporter and the vibrator.

19. The angular rate sensing device of claim 12, wherein the flexible supporting members are arranged at the interior periphery of the vibrator, and the proof mass is arranged at the exterior periphery of the vibrator.

20. The angular rate sensing device of claim 12, wherein the flexible supporting members are arranged at the exterior periphery of the vibrator, and the proof mass is arranged at the interior periphery of the vibrator.

21. The angular rate sensing device of claim 19, further comprises an anchor or a concentric ring base arranged in the central portion of the vibrator to connect the flexible supporting members.

22. The angular rate sensing device of claim 12, wherein the electrodes comprise:
    a plurality of driving electrodes arranged at the positions of 0° and 180° of the vibrator;
    a plurality of close loop control electrodes arranged at the positions of 45° and 225° of the vibrator; and
    a plurality of compensating and control electrodes at the positions of 90°, 135°, 270° and 315° of the vibrator.

23. An angular rate sensing device comprising:
    a base;
    a vibrator having a ring and a plurality of proof masses, arranged in the base, wherein the plurality of proof masses are parallel electrodes;
    a plurality of flexible supporting members connected to the vibrator and supporting the vibrator to be suspended in the base; and
    a plurality of planar electrodes arranged relative to the proof masses, for sensing motion of the proof masses relative to the planar electrodes through the capacitance variation between the planar electrodes and the proof masses.

24. The angular rate sensing device of claim 23, further comprises a first connecting member that connects each of the proof masses to the ring.

25. The angular rate sensing device of claim 23, wherein the electrodes are slot type parallel electrodes, which are configured in differential circuits.

26. The angular rate sensing device of claim 23, wherein the plurality of flexible supporting members comprises elements symmetrical to the driving axis or sensing axis of the vibrator, and are equally arranged at the periphery of the vibrator.

27. The angular rate sensing device of claim 26, wherein the flexible supporting member comprises a flexible supporter set comprising:
  a pair of first supporters; and
  a second supporter connected to the pair of the first supporters.

28. The angular rate sensing device of claim 27, wherein each of the pair of the first supporters further comprises a bending portion connecting the pair of the first supporters and the second supporter.

29. The angular rate sensing device of claim 27, wherein the flexible supporting member further comprises a second connecting member connecting the second supporter and the vibrator to keep a predetermined distance between the second supporter and the vibrator.

30. The angular rate sensing device of claim 27, wherein the flexible supporting members are arranged at the interior periphery of the vibrator, and the proof mass is arranged at the exterior periphery of the vibrator.

31. The angular rate sensing device of claim 23, wherein the flexible supporting members are arranged at the exterior periphery of the vibrator, and the proof mass is arranged at the interior periphery of the vibrator.

32. The angular rate sensing device of claim 30, further comprises an anchor or a concentric ring base arranged in the central portion of the vibrator to connect the flexible supporting members.

33. The angular rate sensing device of claim 23, wherein the proof masses are employed as sensing electrodes, comprising:
  a plurality of first sensing electrodes arranged at the positions of 0°, 90°, 180° and 270° of the vibrator; and
  a plurality of second sensing electrodes arranged at the positions of 45°, 135°, 225° and 315° of the vibrator.

34. The angular rate sensing device of claim 23, wherein the material of the base is silicon-based material or glass, and that of the vibrator is silicon-based material or metal.

35. An angular rate sensing device comprising:
  a first base and a second base;
  a vibrator having a ring and a plurality of proof masses, arranged in the first base, wherein the plurality of proof masses are parallel electrodes and connected to the vibrator;
  a plurality of flexible supporting members connected to the vibrator and supporting the vibrator to be suspended in the first base;
  a plurality of electrodes for controlling and driving the vibrator to oscillate such that the oscillation mode of the vibrator in driving mode may be controlled; and
  a plurality of planar electrodes on the second base and arranged relative to the proof masses for sensing motion of the proof masses relative to the planar electrodes through the capacitance variation between the planar electrodes and the proof masses.

36. The angular rate sensing device of claim 35, further comprises a first connecting member that connects each of the proof masses to the ring.

37. The angular rate sensing device of claim 35, wherein the electrodes are slot type parallel electrodes, which are configured in differential circuits.

38. The angular rate sensing device of claim 35, wherein the plurality of flexible supporting members comprises elements symmetrical to the driving axis or sensing axis of the vibrator, and are equally arranged at the periphery of the vibrator.

39. The angular rate sensing device of claim 38, wherein the flexible supporting member comprises a flexible supporter set comprising:
  a pair of first supporters; and
  a second supporter connected to the pair of the first supporters.

40. The angular rate sensing device of claim 39, wherein each of the pair of the first supporters further comprises a bending portion connecting the pair of the first supporters and the second supporter.

41. The angular rate sensing device of claim 39, wherein the flexible supporting member further comprises a second connecting member connecting the second supporter and the vibrator to keep a predetermined distance between the second supporter and the vibrator.

42. The angular rate sensing device of claim 35, wherein the flexible supporting members are arranged at the interior periphery of the vibrator, and the proof mass is arranged at the exterior periphery of the vibrator.

43. The angular rate sensing device of claim 35, wherein the flexible supporting members are arranged at the exterior periphery of the vibrator, and the proof mass is arranged at the interior periphery of the vibrator.

44. The angular rate sensing device of claim 42, further comprises an anchor or a concentric ring base arranged in the central portion of the vibrator to connect the flexible supporting members.

45. The angular rate sensing device of claim 41, wherein the electrodes comprise:
  a plurality of driving electrodes arranged at the positions of 0° and 180° of the vibrator;
  a plurality of close loop control electrodes arranged at the positions of 45° and 225° of the vibrator; and
  a plurality of compensating and control electrodes at the positions of 90°, 135°, 270° and 315° of the vibrator.

46. The angular rate sensing device of claim 45, wherein each of the electrodes for controlling and driving the vibrator is arranged on a third base and in the flexible supporting members; the first base and the third base are bonded together such that the vibrator suspends in the bases.

47. The angular rate sensing device of claim 35, wherein the proof masses are employed as sensing electrodes, comprising:
  a plurality of first sensing electrodes arranged at the positions of 0°, 90°, 180° and 270° of the vibrator; and
  a plurality of second sensing electrodes arranged at the positions of 45°, 135°, 225° and 315° of the vibrator.

48. The angular rate sensing device of claim 35, further comprises control circuits for the planar electrodes arranged on the second base.

49. The angular rate sensing device of claim 35 further comprises a third base, and control circuits for the driving electrodes and the sensing electrodes arranged on the third base, wherein the first base, the second base and the third base are bonded together, and the material of the third base is silicon-based material or glass.

50. The angular rate sensing device of claim 35, wherein the material of the base is silicon-based material or glass, and that of the vibrator is silicon-based material or metal.

* * * * *